United States Patent [19]
Maier et al.

[11] Patent Number: 5,243,815
[45] Date of Patent: Sep. 14, 1993

[54] ASSEMBLY OF A HEAT EXCHANGER ON A GAS TURBINE ENGINE

[75] Inventors: Karl Maier, Karlsfeld; Helmut Gröss, Esterhofen; Christian Greune, Fürstenfeldbruck, all of Fed. Rep. of Germany

[73] Assignee: Mtu Motoren und Turbinen-Union München GmbH, Munich, Fed. Rep. of Germany

[21] Appl. No.: 892,159

[22] Filed: Jun. 2, 1992

[30] Foreign Application Priority Data

Jun. 7, 1991 [DE] Fed. Rep. of Germany ....... 4118777

[51] Int. Cl.$^5$ .................... F02C 7/10; F02C 7/20
[52] U.S. Cl. ................... 60/39.32; 60/39.511
[58] Field of Search ........... 60/39.511, 39.512, 39.32; 165/4, 81, 83

[56] References Cited

U.S. PATENT DOCUMENTS

| | | | |
|---|---|---|---|
| 3,643,733 | 2/1972 | Hall et al. | 165/81 |
| 3,946,801 | 3/1976 | Brunell et al. | 60/39.511 |
| 3,968,834 | 7/1976 | Mangus et al. | 60/39.511 |
| 4,328,860 | 5/1982 | Hoffmuller | 165/83 |
| 4,697,633 | 10/1987 | Darragh et al. | 60/39.511 |
| 4,750,327 | 6/1988 | Wohrl . | |
| 4,800,955 | 1/1989 | Hagemeister . | |
| 5,065,816 | 11/1991 | Darragh | 60/39.511 |

FOREIGN PATENT DOCUMENTS

3529457 2/1987 Fed. Rep. of Germany .

*Primary Examiner*—Louis J. Casaregola
*Attorney, Agent, or Firm*—Ladas & Parry

[57] ABSTRACT

Apparatus for the compact assembly of a gas turbine engine with a recuperative exhaust gas heat exchanger wherein inlet and outlet ducts of the core of the heat exchanger are supported by support plates attached to the casing of the heat exchanger. The support plates are connected to the engine casing with capability of relative movement between the ducts and the support plates so that thermally produced expansions and contractions are taken up without stress at the support points of the ducts with the support plates and within the heat exchanger. As a consequence, no expansion joints are necessary in the connection lines.

19 Claims, 6 Drawing Sheets

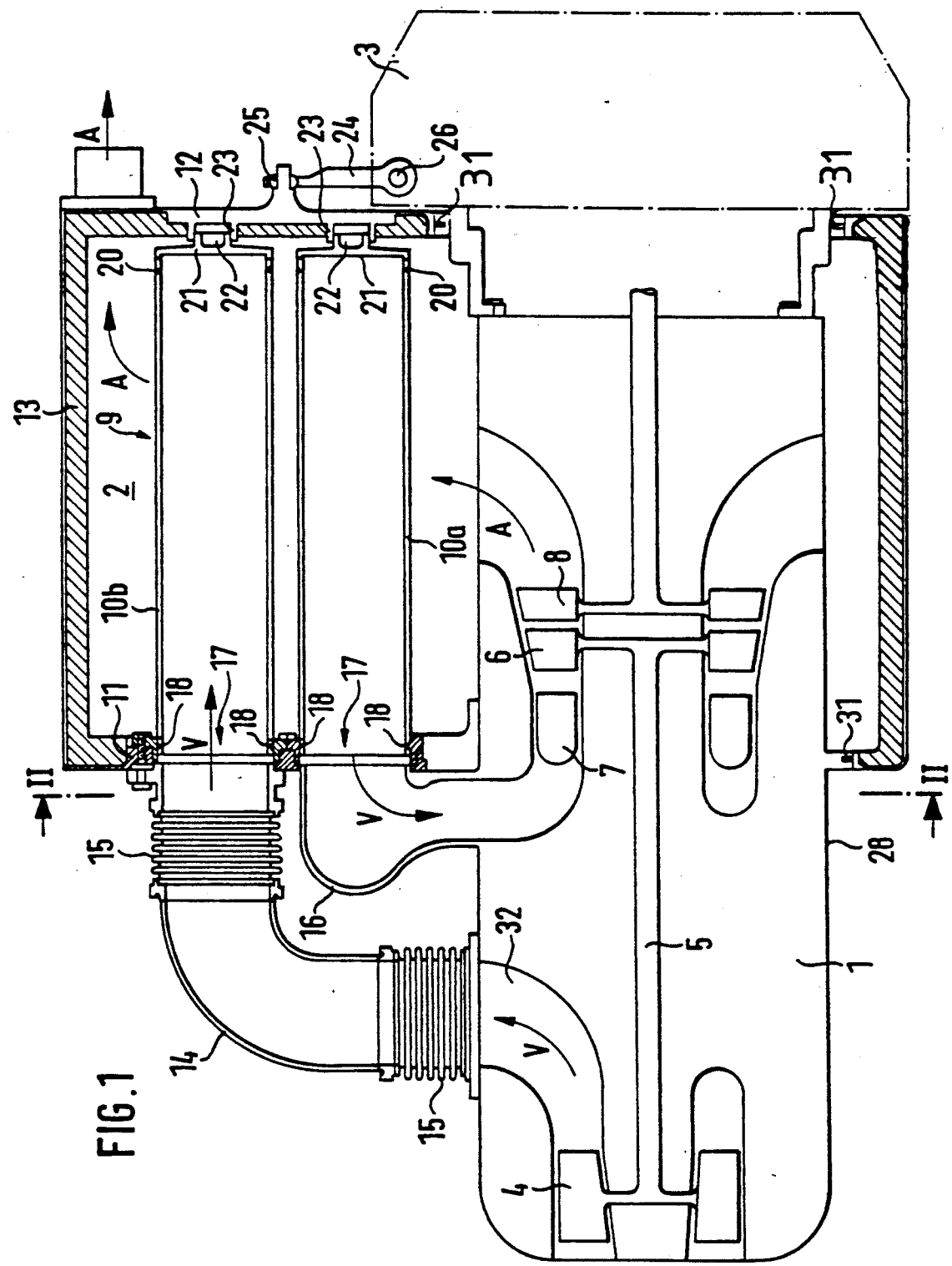

ASSEMBLY OF A HEAT EXCHANGER ON A GAS TURBINE ENGINE

FIELD OF THE INVENTION

The invention relates to an assembly of a recuperative exhaust gas heat exchanger on a gas turbine engine in which hot exhaust gases from the turbine engine flow over heat exchange tubes of a tube matrix of the heat exchanger to heat compressed air passing in the heat exchange tubes from a supply duct to a discharge duct of the heat exchanger.

BACKGROUND AND PRIOR ART

To optimize the thermodynamic cycle of gas turbine engines, especially under partial load conditions, heat exchangers are commonly used. Suitable heat exchange elements, such as heat exchange tubes of a tube matrix are disclosed in DE-PS 36 35 548, where the heat exchange tubes of the tube matrix are of U-shape. These tube matrixes are attached to ducts that serve as manifolds to supply compressed air to be heated and as collectors for the compressed air after it is heated.

Efforts to achieve compact connection of heat exchangers with gas turbines have heretofore encountered substantial difficulties in that the problem was not only to transfer deadweight loads and acceleration forces from the tube matrix to the engine, but also to minimize the development of loads from large temperature differences. Since the engine is intended for vehicular applications, a limited installation space is available which requires a space-saving construction not necessarily compatible with the requirement for low weight.

In a design disclosed in DE-PS 35 29 457 the heat exchanger casing is designed as a cantilevered load-bearing structure one end of which is secured to the turbine. In this arrangement the forces acting on the tube matrix, i.e. deadweight and the acceleration forces, are resisted by the heat exchanger casing. Relatively large expansion movements, especially when vertical acceleration forces act on the opposite end, are produced. This necessitates a correspondingly elaborate casing construction to achieve the requisite rigidity. This design carries a considerable weight penalty and does little to achieve a space-saving close attachment of the tube matrix to the turbine, for the reason that the bearing and casing configuration requires additional space between the tube matrix and the gas turbine.

A gas turbine with an attached heat exchanger has also been disclosed in U.S. Pat. No. 3,968,834, where a rigid frame envelopes the heat exchanger core to contain the core. Said frame in turn bears on the engine through a tubular rack. The heat exchanger core proper is suspended in the frame by means of two trunnions on opposite sides, with no provision to locate the core axially. A point transfer of heat exchanger loads to the frame produces peak stresses in the suspension members and, especially for vehicular applications, stress cracking in the heat exchanger. Ultimately, this particular arrangement of transfer of forces from the heat exchanger core through trunnions, frame, rack and bearing produces a rather elaborate design defeating the effort for an effective light-weight construction.

SUMMARY OF THE INVENTION

An object of the present invention is to provide a space and weight-saving connection between a gas turbine engine and a heat exchanger which provides substantially stress-free thermal expansion of the tube matrix and casing of the heat exchanger and ready replaceability of the heat exchanger components.

It is a particular object of the present invention to provide an arrangement where the ends of the ducts of the heat exchanger are supported on the engine casing through the intermediary of two support plates, the ducts being seated in openings in a first one of the support plates and being axially movably supported at their opposite ends from the engine casing through the second of the support plates.

The construction according to the present invention provides an advantage that by transmitting the heat exchanger loads directly through the support plates, the unstressed heat exchanger casing can be of a flexible, light-weight construction designed to economize weight and cost. Direct attachment of the tube matrix in close proximity to the gas turbine saves a substantial amount of space, and the need for additional hot gas feed lines is obviated. The relatively great resilience of the tube matrix in all planes, plus the low-stress two-point support of the ducts in the support plates, eliminates the need for further expansion joints, reduces thermally and mechanically induced relative movements of the components and significantly prevents thermal stressing. This reduces the risk of operational damage. The effect is assisted by the unimpeded expansion of the ducts and of the heat exchanger casing.

Ease of replaceability is obtained in that the heat exchanger can be separated simply by detaching it from the support plates, preferably by loosening a small number of threaded fasteners. This permits fast, low-cost replacement of deficient heat exchanger components. The construction of the present invention also produces a smaller size of the entire propulsion assembly due to a minimal spacing between the gas turbine and the heat exchanger.

In an advantageous aspect of the present invention, thermally induced displacement between the two support plates is compensated by providing slight axial clearance of the ducts in the first support plate to give the ducts freedom to move axially in opposite directions. This prevents major stresses from developing in the components.

According to a feature of the invention, the ends of the ducts are supported in the first support plate by split rings which have internal ridges engaged in slots in the ends of the ducts to permit relative axial movement in opposite directions. This permits low-stress load transfer and axial movements of the ducts to accommodate thermal displacements. Ease of installation is achieved by designing the components for connection by bolts.

According to a further feature of the invention, the second support plate is pivotably connected to a link member which, in turn, is pivotably connected relative to the engine casing while the first support plate is detachably connected relative to the engine casing. This provides rapid and easy separation of the heat exchanger from the gas turbine if the need for replacement arises, while still permitting a necessary end float of the ducts relative to the heat exchanger casing during operating conditions. Also, differential thermal expansion of the ducts is compensated by the movable support plates, the light-weight flexible heat exchanger casing permitting the support plates to move on said ducts. Because the connection between the heat exchanger casing and the support plates is detachable, further weight is saved and installation remains straightforward.

The ducts are provided with end covers which simultaneously close off and seal one end of the ducts and provide for support of the ducts in the second support plate. The connection of the end covers to the ducts is separable so that the covers can alternatively be positioned at the other ends, of the ducts, whereby the tube matrix can be reversed.

A low-stress connection of the pipe conveying compressed air to the inlet duct is achieved in accordance with the present invention by providing flexible expansion joints in the pipe.

According to a modified embodiment of the invention, the first support plate is divided into two sections, one connected to the pipe for supply of compressed air, the other to a casing which supplies heated compressed air from the outlet duct of the heat exchanger to the engine. This construction eliminates the need for heavy, bulky expansion joints. The difference in thermal expansion between the duct connections is absorbed by the tube matrix due to its great flexibility in all planes, as typical of the arrangement in DE-PS 36 35 548.

The use of low-pressure and high-pressure seals as needed between components of moderate relative movement advantageously prevents the leakage of hot exhaust gas or compressed air.

A direct and, therefore, space-saving connection of the outlet duct to the combustion chamber is contemplated according to the invention. In this regard, the first support plate is connected to an inlet casing of the combustion chamber to prevent high differential temperatures, and, thus, obviate the need for further expansion joints.

According to another feature of the invention, the position of the tube matrix relative to the support plates is reversible to give the tube matrix a much longer life.

According to a further feature, the need for a separate, heavy-weight hot gas fed duct to the heat exchanger is eliminated by making the heat exchanger casing envelope the engine.

BRIEF DESCRIPTION OF THE FIGURES OF THE DRAWING

FIG. 1 is an elevation view diagrammatically illustrating, partly in section, an assembly of a gas turbine and heat exchanger according to the invention.

DETAILED DESCRIPTION OF PREFERRED EMBODIMENTS

Figure 2B:
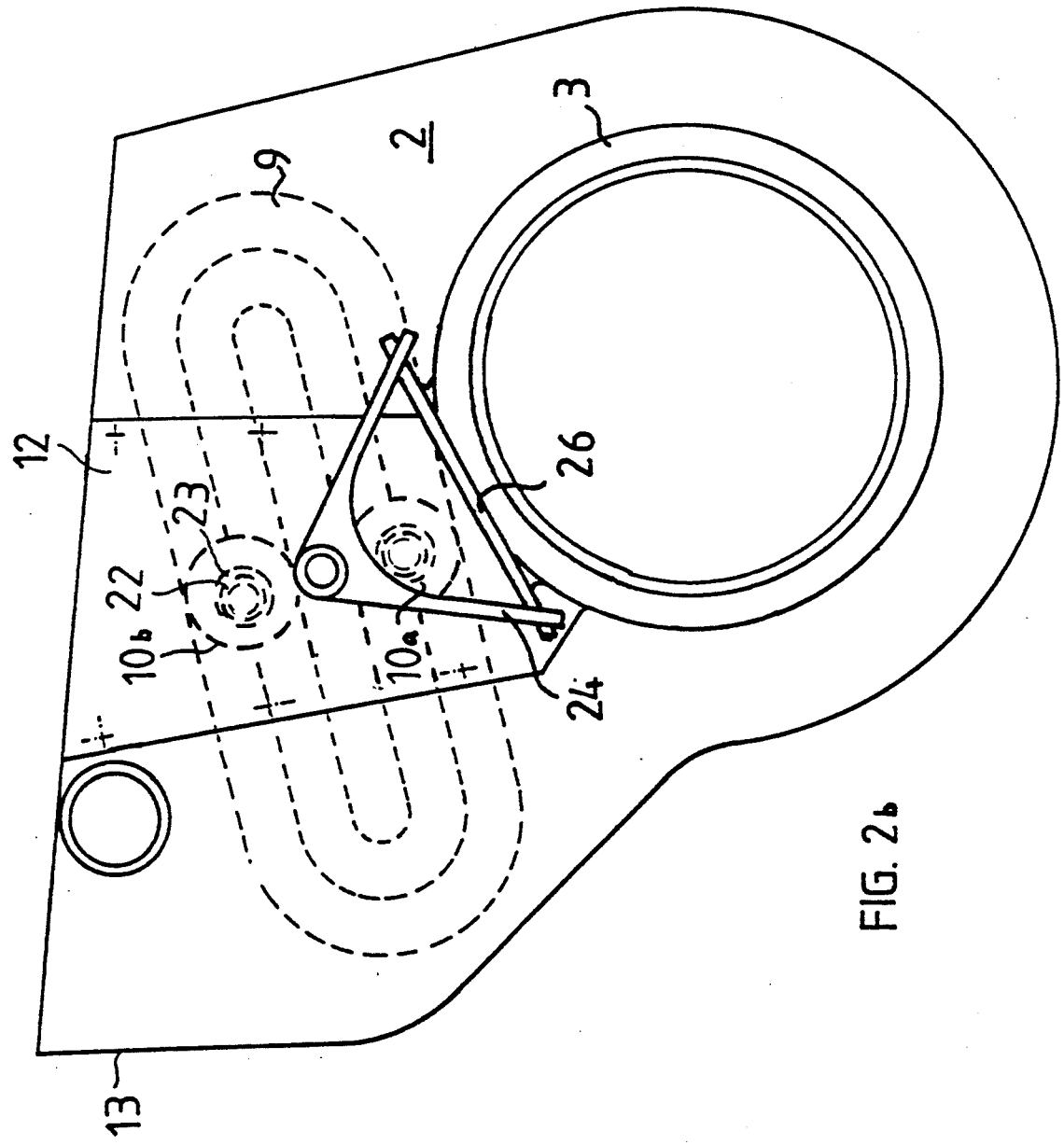
FIG. 2b is an end view of the assembly as seen from the right in FIG. 1.

With reference now to FIG. 1, therein is shown a gas turbine engine 1 having a recuperative exhaust gas heat exchanger 2 and a gearbox 3. The gas turbine engine comprises a compressor 4 driven by a turbine 6 through a turbine shaft 5, and a combustion chamber 7. The gearbox 3 is secured to the engine 1 and driven by a downstream power turbine 8 of the engine. The heat exchanger 2 comprises a core constituted by a tube matrix 9 (diagrammatically illustrated in dotted outline in FIG. 2) and two ducts 10a and 10b. Compressed air V is conveyed from compressor 4 to duct 10b, serving as an inlet duct or manifold, and the compressed air flows from duct 10b into U-shaped heat exchange tubes of tube matrix 9 to duct 10a serving as a collector duct. The U-shaped tubes are arranged as a bundle in rows and columns with spacing between the tubes, and the compressed air flowing in the tubes is heated by hot exhaust gases A from the gas turbine engine 1. For this purpose, the heat exchanger 2 has a casing 13 which surrounds the casing of the engine 1 and receives the hot exhaust gases A from the engine 1 and conveys the gases A around the tubes of the tube matrix and ultimately discharges the gases from the casing 13.

The heat exchanger 2 further comprises intermediate support plates 11 and 12 by which the heat exchanger is supported from the engine 1. In order to supply the compressed air V to the duct 10b, a pipe 14 having two expansion joints 15 at its ends is connected at one end to gas turbine engine 1 and at its other end the pipe is detachably connected by bolts to casing 13. The heated compressed air V is discharged from duct 10a of the heat exchanger 2 and is conveyed through a casing 16 to the combustion chamber 7. The U-shaped tubes of matrix 9 have bends at which the compressed air flowing in the tubes undergoes reversal of direction and the heat exchange tubes have ends opposite the bends which are respectively connected to ducts 10a and 10b.

The compressed air V flows through the pipe 14 into the duct 10b and then through the heat exchange tubes to the duct 10a. The hot exhaust gas A from the gas turbine engine 1 flows around the outer surfaces of the heat exchange tubes and heat is transferred to the compressed air V flowing within the tubes.

Figure 2:
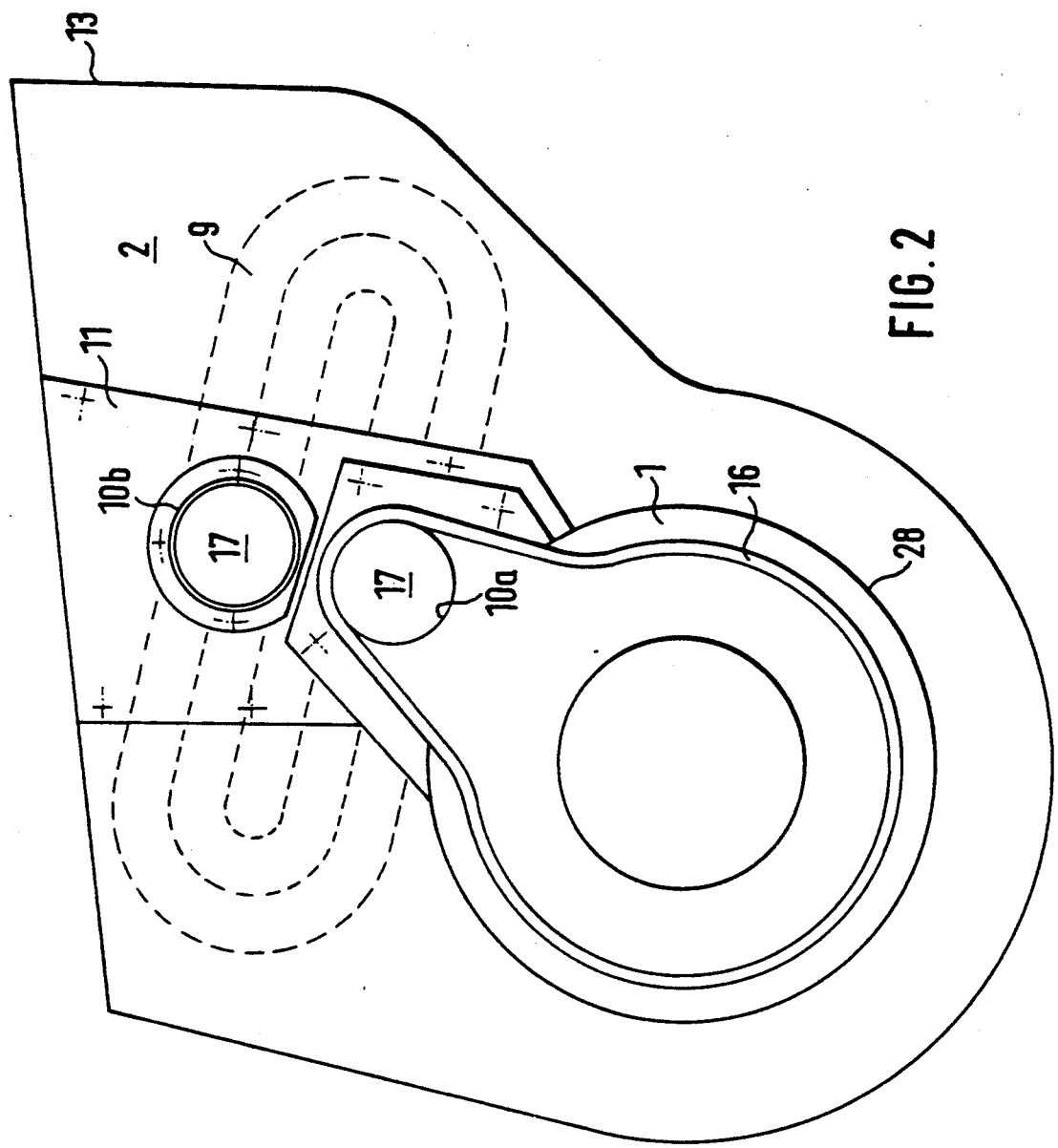
FIG. 2 is a cross-sectional view taken along line II—II in FIG. 1.
Figure 3:
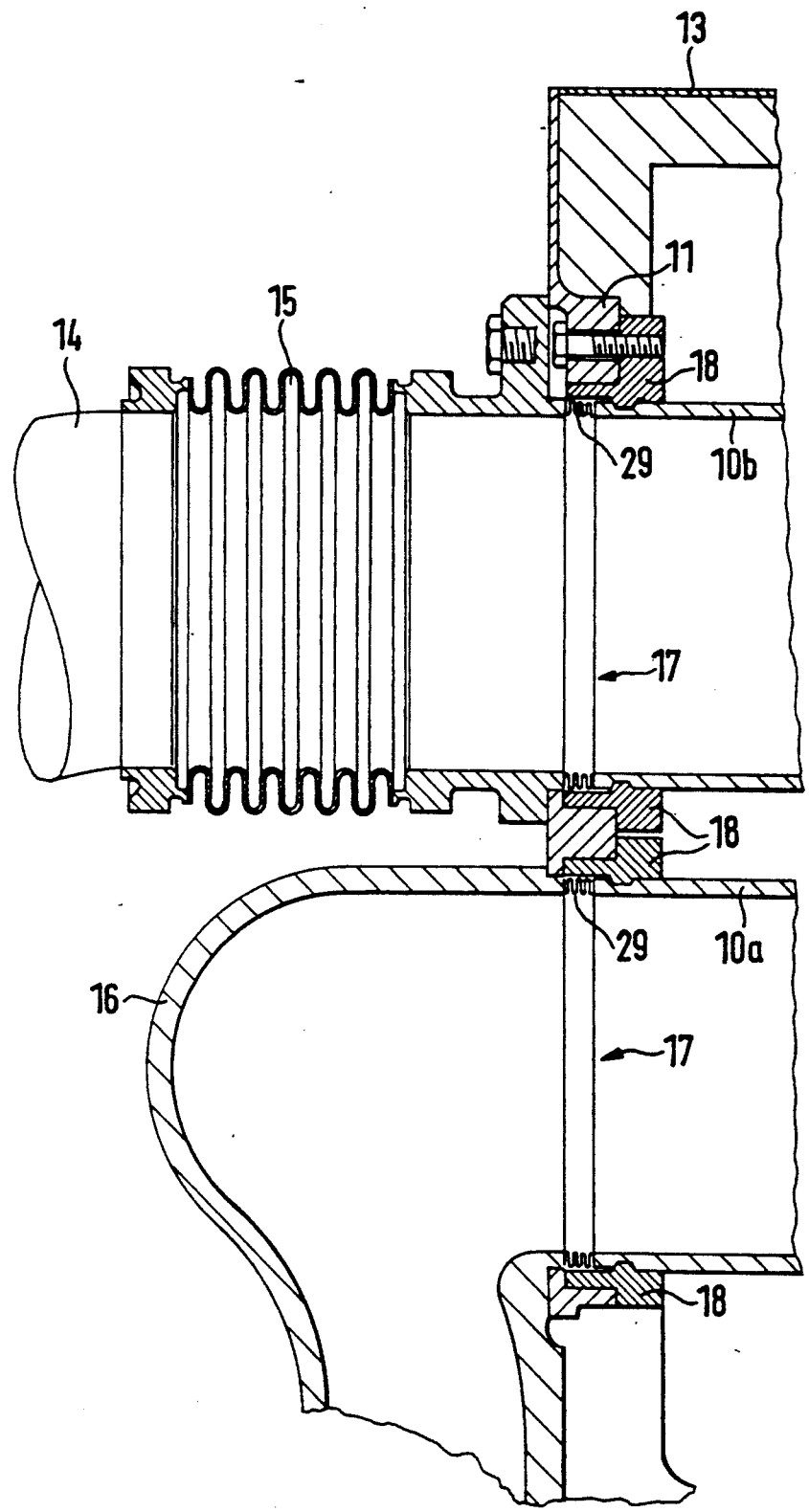
FIG. 3 is an enlarged view of a detail of a first embodiment of a connection between a first support plate for the heat exchanger from the engine according to the invention.
Figure 4:
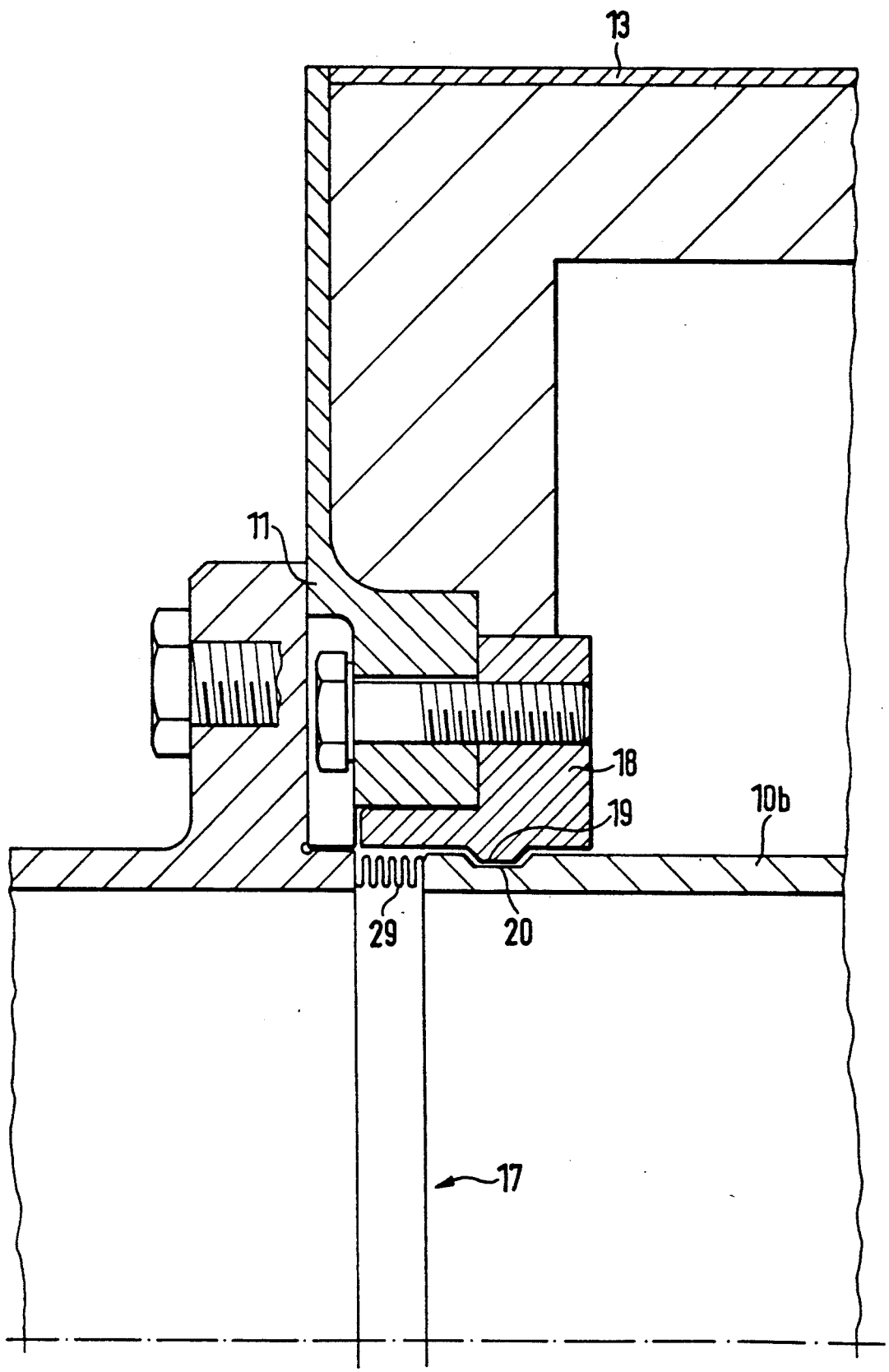
FIG. 4 shows a further selective enlargement of the embodiment in FIG. 3.

In order to attach the heat exchanger 2 to the engine, the ends of the ducts 10a 10b are supported in the intermediate support plates 11 and 12. For this purpose, the first intermediate plate 11 is provided with two openings 17 (FIGS. 2, 3 and 5), in which the ducts 10a and 10b are radially and axially received in split bearing rings 18 which coaxially surround openings 17. The bearing rings 18 are connected by bolts B to intermediate plate 11 (FIGS. 3 and 4). The ducts 10a and 10b are surrounded by the bearing rings 18. The rings 18 are provided with internal ridges 19 which engage in a circumferential slot 20 provided in the ends of ducts 10a and 10b (FIG. 4). A slight clearance is provided for the ridges 19 in the slots 20 to permit the ducts 10a and 10b to move axially in both directions to compensate for thermally induced expansion or contraction between the intermediate support plates 11 and 12 and within the tube matrix 9. At their opposite ends, the two ducts 10a and 10b each have an end cover 21 which is sealed to close the ends of the ducts and the end covers 21 are supported on journals 22 in a bearing bush 23 of the second intermediate plate 12, for slight axial movement of the ducts. The length of contact between the journal 22 and the bearing bush 23 is designed to let the intermediate plate 12 absorb some amount of cant to compensate for offset without jamming. On the side of intermediate plate 12 remote from ducts 10a and 10b, the plate 12 is supported by the gearbox 3 which is secured to the gas turbine engine 1. The plate 12 is supported by gearbox 3 through a hinged support 24 that permits rocking movement and axial displacement of the plate 12 relative to the gearbox 3. For this purpose, the support 24 is connected at its upper end to the intermediate plate 12 through a ball and socket joint 25 to provide relative universal movement, and at its other end the support 24 is pivotably connected to the gearbox 3 by a rotatable mounting on a journal 26 fixed to the gearbox. The intermediate support plate 12 is connected to the first intermediate plate 11 through the heat exchanger casing 13, to which it is bolted. The intermediate support plate 11 is also bolted to the casing 13.

In order to be able to support the tube matrix 9 in either direction between the intermediate plates 11 and 12, the ducts 10a and 10b are each provided with a slot 20 at each end. Similarly the end covers 21 can be assembled on either end of the ducts 10a and 10b. In this way, the core of the heat exchanger constituted by the ducts and the tube matrix can be installed as shown in FIG. 2 or it can be reversed so that the left ends of the ducts 10a and 10b will be supported in the right support plate 12 while the right ends of the ducts are supported in the left support plate 11. In this arrangement, the heat exchange tubes of tube matrix 9 will be inclined in the opposite direction in FIG. 2. Alternatively, if the ducts are turned end to end and inverted so that duct 10a is at the top and duct 10b at the bottom, the original inclination of the heat exchange tubes will be retained.

In FIG. 2 there can be seen the inlet casing 16 for the combustion chamber 7 and the tube matrix 9 in dotted outline.

Figure 5:
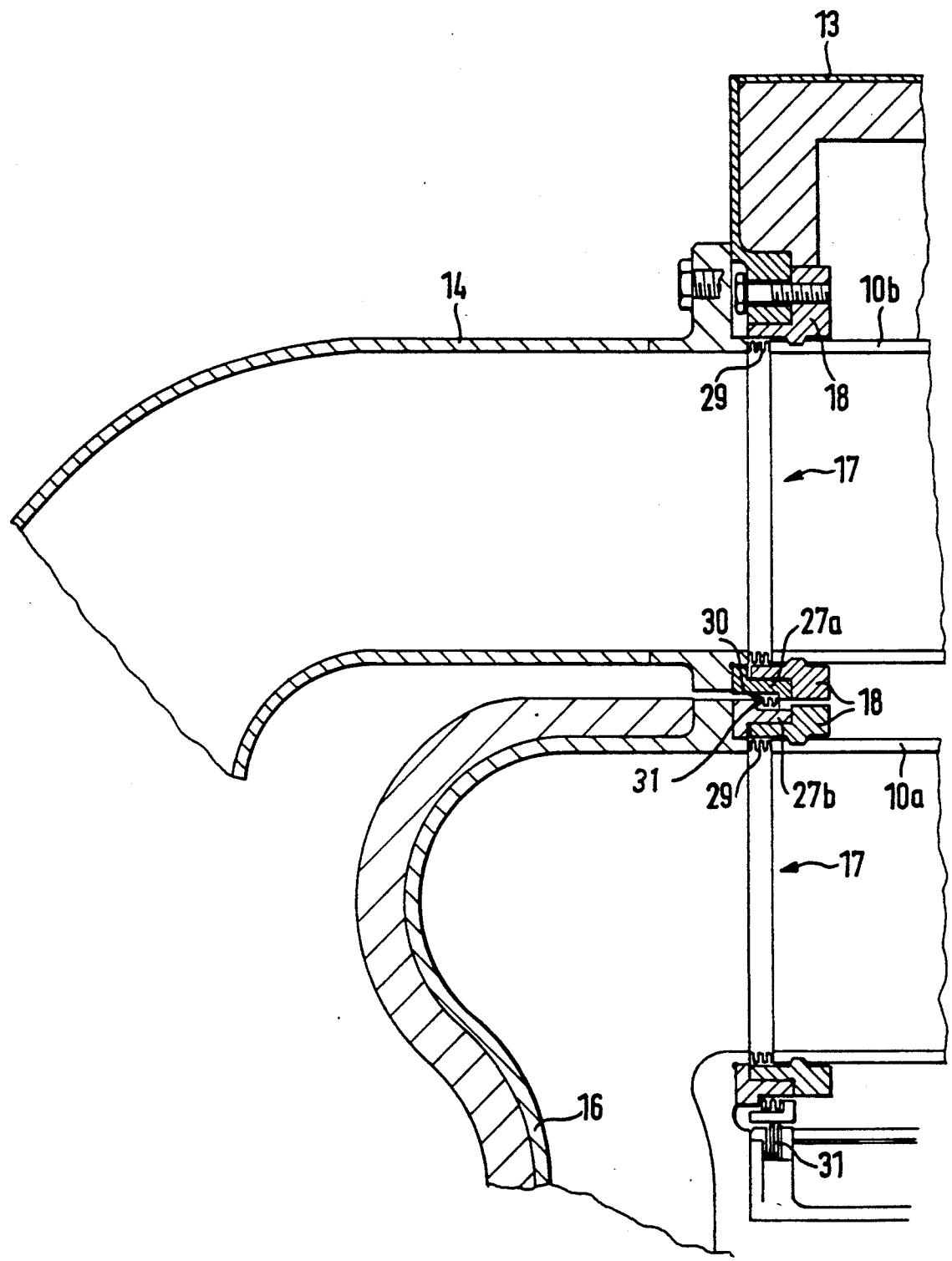
FIG. 5 is an enlarged view of a detail of a modified embodiment of the connection in FIG. 3.

FIG. 5 shows a modified embodiment in which a split version of the first support plate 11 is provided. Therein, the duct 10b is inserted into a first plate 27a and bolted to the now rigid pipe 14 which supplies the compressed air V to the tube matrix 9. A portion of the load on the tube matrix, therefore, is transferred to the casing 28 of engine 1 through the pipe 14. The duct 10a is received in a second plate 27b bolted to the casing 16 which conveys the heated compressed air V to the combustion chamber 7. The bearing loads from the second plate 27b, therefore, are transferred to the engine casing 28 through the casing 16, which effectively forms part of the engine casing 28. Displacements between the two ducts 10a and 10b or relative to the heat exchanger casing 13 will therefore produce little stress and will be absorbed by the inherent flexibility of the tube matrix 9 and the movements of the second support plate 12.

Since the ducts 10a and 10b and the inlet and outlet lines are pressurized with compressed air, flexible high-pressure seals 29 are provided between the connecting points to compensate for movements at the connecting points and prevent leakage (FIGS. 3 and 5).

To present the exhaust gases from leaking at points between the pates 27a, 27b and between the heat exchanger casing 13 and the casing 28 of engine 1, flexible low-pressure seals 31 are provided which compensate for displacements and maintain sealing integrity (FIG. 5).

In an alternative arrangement, the heat exchanger casing 13 is not attached to the first plate 27a, but to the second plate 27b, with the seals adapted to suit.

Although the invention has been described in relation to specific embodiments thereof, it will become apparent to those skilled in the art that numerous modifications and variations can be made within the scope and spirit of the invention as defined in the attached claims.

What is claimed is:

1. Apparatus for the connection of a gas turbine engine and a recuperative exhaust gas heat exchanger, said gas turbine engine comprising a casing, said heat exchanger comprising a matrix of heat exchange tubes, a first duct for receiving compressed air and for supplying the compressed air to said matrix wherein the compressed air is heated by exhaust gases from said gas turbine engine, a second duct connected to said matrix and to said gas turbine engine for receiving heated compressed air from said matrix and for supplying the same to said gas turbine engine, and a heat exchanger casing enclosing said matrix and said first and second ducts, said apparatus comprising first and second spaced intermediate support plates supported from said casing of the engine, said heat exchanger casing being supported by said intermediate plates in a space between said intermediate plates, means providing movable support of said second intermediate plate from the engine casing and including means connecting the second intermediate support plate with respect to the casing of the engine for relative movement therebetween, said first and second ducts each having opposite first and second ends, said first ends of said first and second ducts being supported in openings provided in said first intermediate support plate, and means respectively supporting said second ends of said first and second ducts from said second intermediate support plate for relative movement axially of said ducts.

2. Apparatus as claimed in claim 1, comprising means at said openings in said first intermediate support plate for radially and axially supporting said first and second ducts in said openings while providing limited relative axial movement in opposite directions.

3. Apparatus as claimed in claim 2, wherein said means for supporting said first and second ducts in said openings in said first intermediate support plate comprises a split-ring coaxially disposed at each opening and detachably connected to said first support plate.

4. Apparatus as claimed in claim 3, wherein said means for supporting said first and second ducts in said openings further comprises a radial ridge projecting inwardly of each said split ring, said first and second ducts each having a circumferential slot into which a respective said radial ridge is engaged with clearance.

5. Apparatus as claimed in claim 1, wherein said means connecting said second intermediate support plate to the casing of the gas turbine engine comprises a support pivotably connected to said second intermediate support plate and means pivotably connecting said support relative to said casing of the gas turbine engine to permit relative axial movement between said second intermediate support plate and said casing of the gas turbine engine.

6. Apparatus as claimed in claim 5, wherein said second ends of said first and second ducts are remote from said first intermediate support plate and include detachable covers at said second ends sealing said first and second ducts.

7. Apparatus as claimed in claim 1, comprising a pipe with expansion joints detachably connected relative to said first support plate for conveying compressed air to said first duct.

8. Apparatus as claimed in claim 7, further comprising means detachably connecting said pipe relative to said first intermediate support plate.

9. Apparatus as claimed in claim 1, wherein said first support plate comprises two sections, a pipe for conveying compressed air being detachably connected relative to one of said sections of said first support plate so as to be in communication with said first duct, said second duct being supported by the other of said sections of said first support plate, and means connecting said other of said sections of said first support plate to said casing of the gas turbine engine.

10. Apparatus as claimed in claim 9, comprising flexible low pressure seals between said two sections of the first support plate to prevent leakage therebetween of exhaust gases from the gas turbine engine.

11. Apparatus as claimed in claim 1, wherein said gas turbine engine comprises a combustion chamber, and an inlet casing for supplying heated compressed air from said second duct to the combustion chamber, said inlet casing being secured to the casing of the gas turbine engine and to said first support plate.

12. Apparatus as claimed in claim 1, comprising a pipe for conveying compressed air to said first duct, flexible high-pressure seal means respectively between said first and second ducts and said pipe and inlet casing for preventing leakage of compressed air.

13. Apparatus as claimed in claim 1, wherein said first and second ducts have respective ends with means enabling said ends of said first and second ducts to be supported from said first and second support plates.

14. Apparatus as claimed in claim 1, comprising seal means between the casing of the gas turbine engine and the heat exchanger casing.

15. Apparatus as claimed in claim 1, wherein said heat exchanger casing encircles said engine casing, means being provided to seal said casings to one another.

16. Apparatus for the connection of a gas turbine engine with a recuperative exhaust gas heat exchanger, said gas turbine engine comprising a casing, said heat exchanger comprising a matrix of heat exchanger tubes, a first duct for receiving compressed air and supplying the compressed air to said matrix wherein the compressed air is heated by exhaust gases from said gas turbine engine, a second duct connected to said matrix and to said gas turbine engine for receiving heated compressed air from said matrix and supplying the same to said gas turbine engine, and a heat exchanger casing enclosing said matrix and said first and second ducts, said apparatus comprising:

support means secured to said casing of the heat exchanger and supporting said ducts for limited relative displacement, said support means comprising first and second axially spaced intermediate support plates supporting said heat exchanger casing between said intermediate plates, said first and second intermediate support plates providing support for said ducts to enable relative displacement in response to thermal changes; and means supporting said support means from said engine casing for relative displacement of said support means and thereby of said ducts and said tube matrix relative to said engine casing, said means supporting said support means from said engine casing comprising means providing relative displacement between said second intermediate support plate and said engine casing.

17. Apparatus as claimed in claim 16, wherein said ducts have respective opposite ends and said first and second intermediate support plates support said ducts for limited relative axial displacement between said ducts and said support plates.

18. Apparatus as claimed in claim 17, wherein said means supporting said support means from said engine casing further comprises means securing said first and second support plates to said heat exchanger casing.

19. Apparatus as claimed in claim 16, wherein said heat exchanger casing surrounds said engine casing, said engine casing communicating with the interior of said heat exchanger casing to supply engine exhaust gases thereto and to the tube matrix of the heat exchanger.

* * * * *